July 7, 1970  F. G. GEIL  3,519,105
VEHICLE CONTROL
Filed Oct. 13, 1965  4 Sheets-Sheet 2
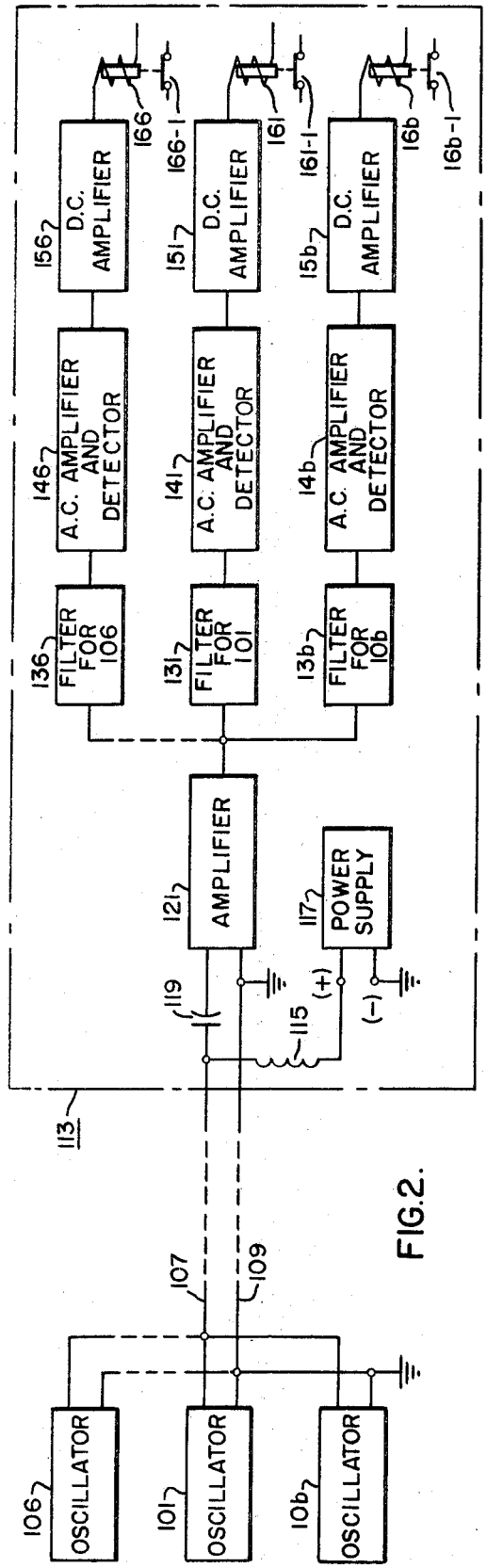
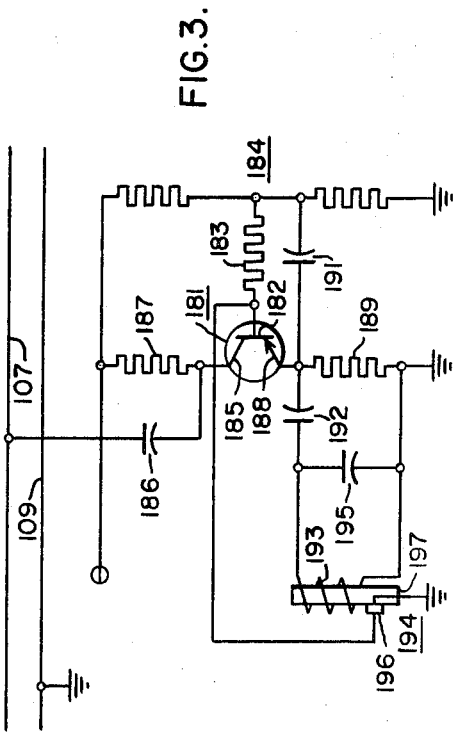

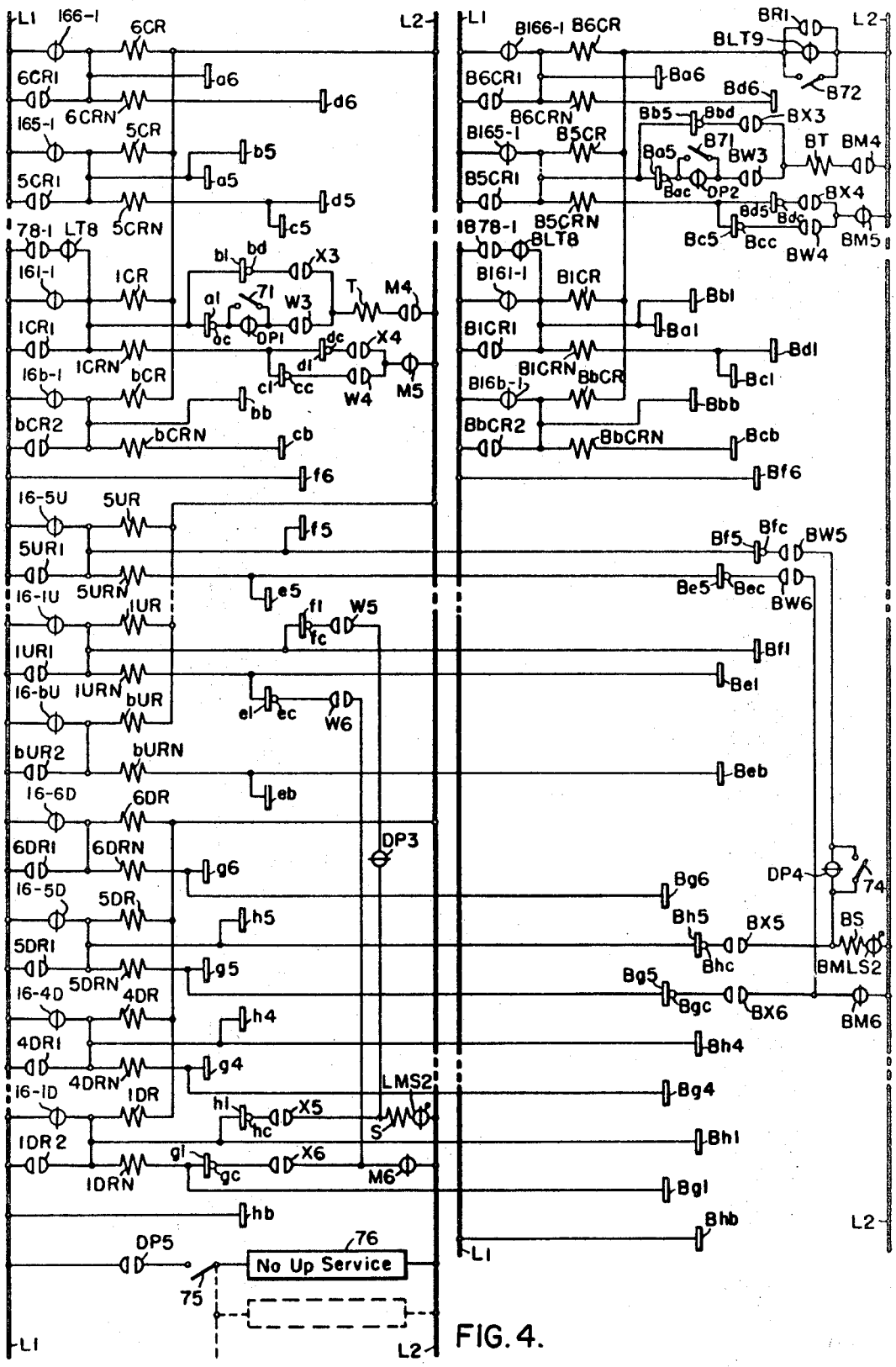

United States Patent Office 3,519,105
Patented July 7, 1970

3,519,105
VEHICLE CONTROL
Frederick G. Geil, Pittsburgh, Pa., assignor to Westinghouse Electric Corporation, Pittsburgh, Pa., a corporation of Pennsylvania
Filed Oct. 13, 1965, Ser. No. 495,412
Int. Cl. B66b 1/14
U.S. Cl. 187—29                                   8 Claims

ABSTRACT OF THE DISCLOSURE

Transmitter means on a vehicle includes an electric oscillator employing a magnetostrictive member which vibrates mechanically as long as the oscillator is in oscillation. When the magnetostrictive member is touched it ceases to vibrate and oscillation of the oscillator ceases. Upon release of the magnetostrictive member it is free to vibrate and the oscillator again oscillates. The oscillations are transmitted to a remote receiver. When the oscillations are no longer received the vehicle is brought to a stop at a predetermined landing.

---

This invention relates to vehicle control systems and particularly to arrangements for controlling the stopping and starting of elevators at the various floors chosen by passengers.

To satisfy the requirements of passenger service, arrangements must be provided whereby passengers entering an elevator car may cause it to stop at any floor they may choose. Elevator systems, called automatically-controlled or "automatic," which carry no attendant, may have a battery of push buttons which enable each passenger to register in advance a call for the car to stop at any floor in the building which he may select. D. Santini et al. U.S. Pat. No. 2,740,495 issued Apr. 3, 1956 and assigned to the Westinghouse Electric Corporation of East Pittsburgh, Pa., which describes and claims an elevator system of the type just mentioned, may be taken as exemplifying systems to which applicant's invention is applicable.

The vast majority of modern passenger elevators are, like Santini et al., moved up and down by cables passing over traction-sheaves driven by electric motors located just above the top floor served, and since the stopping and starting of these fixed motors must be controllable from the moving elevator car, a flexible cable, connected at one end to push buttons in the car, and at the other end to a control-panel beside the motor, is provided to electrically link the motor control-panel to its controlling push buttons. Moreover, prospective passengers at any floor must be able to stop the elevator car for boarding, so an up and/or a down push button is provided at each floor and each button is connected by suitable control circuits with the above-mentioned control panel beside the motor.

It will readily be seen that in a many-floored modern office building having a push button for each building-floor, the flexible control-cable mentioned above must be pretty large and heavy. And even the number of wires connecting the floor or corridor push buttons just mentioned to the motor control-panel must be bulky and expensive.

In accordance with the present invention, the use of a heavy, stiff and expensive cable as a control-channel between the car push buttons and the motor control-panel is avoided by providing each call-button on the elevator car with an electrical oscillation generator of its own separate frequency which it impresses on the motor control-panel except during a brief interruption when a call is being registered by a passenger, constituting such control-channel of a single-conductor from cars to the fixed motor-control panel, and segregating the currents of the different frequencies by filters at the panel so that each makes its own relay conductive there except when the current of its own frequency is interrupted briefly at the car-call-means by a passenger. Such an arrangement has the advantage over those of the prior art, as exemplified in Santini et al., not only of reducing the size of the multi-conductor cable from elevator car to control-panel, but of having what may be termed a fail-safe property, i.e., failure to generate by any, or all but one, oscillation generators will result only in the elevator stopping at a floor. Another desirable feature of the "normally on" system here disclosed is its immunity to pulse interference.

One object of this invention is to provide elevator systems in which the driving-motors or other electrical control circuits positioned on the floors of the building served may be controlled from the elevator car through a single control-channel.

Another object of this invention is to provide for control by passengers on an elevator car of circuits located on the building structure through a control channel having conductors fewer in number than the number of building floors served.

Another object is to provide for passenger control of the stopping, starting and direction of movement of an elevator car through a flexible cable having a number of separate conductors relatively small compared with the number of floors served.

Still another object is to provide for control of apparatus fixed on the floors of a building from an elevator car operating therein by a novel, more simple, less costly and less vulnerable control-channel than those of the prior art.

Yet another object is to provide an arrangement for control-equipment carried on an elevator car to control motor circuits fixed on the building served through a single-channel flexible control-link.

Still another object of this invention is to provide elevator systems with arrangements for controlling apparatus based on the building structure from devices carried on the elevator car in which failure of electric currents from the car to appear at the outlet-end of a control channel between car and building shall result in stopping said car.

Yet another object is to provide elevator systems in which electrical control circuits fixed to the building served may be controlled from the elevator car through arrangements the operation of which is not interfered with by "noise" or spurious outside effects.

Still another object is to provide elevator systems in which electrical control circuits fixed to the building served may be controlled from the elevator car from a control-voltage supply which is of relatively poor regulation.

Another object is to provide elevator systems having car-calling stations positioned at various floor stations remote from a car-control panel with arrangements in which a single control-channel portion suffices for delivery of separate control signals respectively characteristic of said floor-stations, to said control panel.

The foregoing and other objects will be made evident upon reading the following description, taken in connection with the drawings, in which:

FIG. 1, which is largely similar to FIG. 1 of the above-mentioned Santini et al. patent, is a view in elevation, with parts broken away of an elevator system in which the invention is incorporated;

FIG. 2 is a block diagram of electrical circuits which are a desirable mode of carrying out the invention;

FIG. 3 is a schematic elevational view of an electrical oscillation generator system which is particularly suitable for use in carrying out the invention;

FIG. 4 is a schematic view in straight line form showing control circuits suitable for embodiment in the invention.

Figure 1:
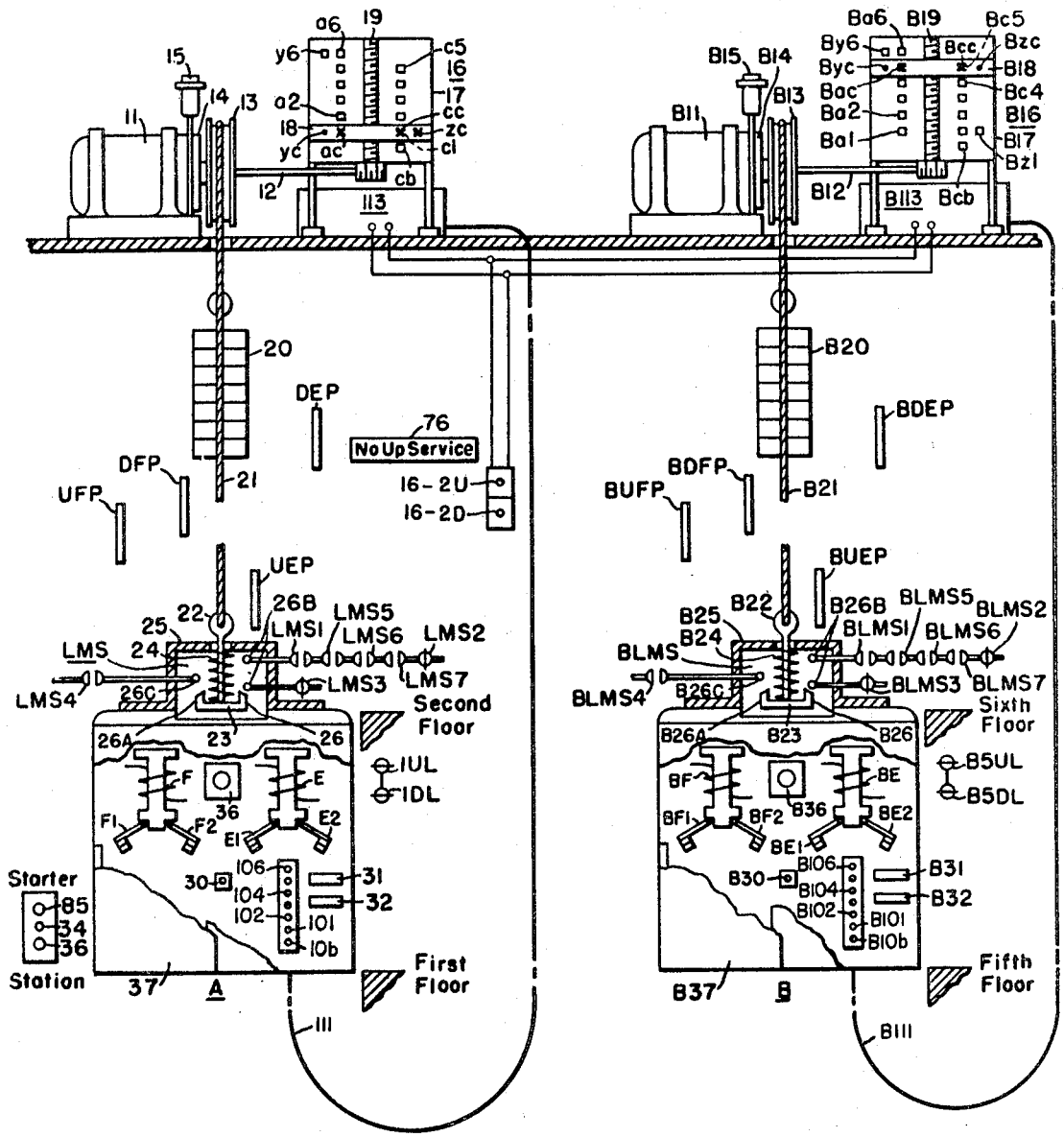

To facilitate reading, FIGS. 1 and 4 employ the same reference numerals for certain similar parts appearing in FIGS. 1 and 4 of the above-mentioned Santini et al. patent.

The invention may be applied to a transportation system having any desired number of vehicles or cars for serving any desired number of landings. In order to simplify the presentation of the invention it will be described as incorporated in the elevator system of the aforesaid Santini et al. patent. Except as noted below, the elevator system illustrated and described in the aforesaid Santini et al. patent is here incorporated by reference.

In order to illustrate the present invention certain changes have been made in FIGS. 1 and 4 of the aforesaid Santini et al. patent and these figures together with the changes have been here reproduced as FIGS. 1 and 4 of the present application. The only other changes required for the Santini et al. system consist of the addition of certain electrical circuits which are shown in block form in the present FIG. 2. These figures now will be considered.

The present FIG. 1 is identical to FIG. 1 of the aforesaid Santini et al. patent except for the following changes. A traveling or flexible cable 111 is shown which extends from the elevator car A to the penthouse. This flexible cable is of conventional construction and is employed for establishing connections between electrical components located on the elevator car A and circuits located in a control cabinet 113 which is positioned in the penthouse. A similar traveling or flexible cable B111 and a similar control cabinet B113 are illustrated for the car B.

In the Santini et al. patent a car station was illustrated having a plurality of push buttons b, c and 1c to 6c which were actuated for the purpose of registering car calls for the car A. In accordance with the present invention these push buttons are replaced by call devices in the form of electrical oscillation sources or oscillators 10b and 101 to 106, respectively. Each of these oscillators generates a distinctive frequency and all of the oscillators are connected through a common circuit included in the travelling or flexible cable 111 to the control panel 113 for the purpose of controlling circuits located in the penthouse. Similar car-call devices are illustrated in FIG. 1 for the car B.

In the aforesaid Santini et al. patent, floor call pushbuttons are located at a plurality of the floors for the purpose of registering floor calls. In accordance with the present invention these push buttons are replaced by electrical oscillation sources or oscillators which are connected through a common circuit to the control panels 113, etc., for all of the elevators in order to control circuits located in the penthouse. For example, in FIG. 1 an oscillator 16–2U is located. This oscillator may be operated for the purpose of registering a floor call for the second floor in the up direction. FIG. 1 also shows an oscillator 16–2D which may be operated for the purpose of registering a down floor call for the second floor.

In FIG. 2 three oscillators 10b, 101 and 106 are illustrated respectively for the basement, first and sixth floors. It will be understood that these together with oscillators 102 to 105 for the second to fifth floors (not shown) are located in the elevator car A for the purpose of registering calls for the various floors. The oscillators are of similar construction but are adjusted to provide a separate frequency for each of the oscillators. A suitable construction for an oscillator will be discussed with reference to FIG. 3 below. Each oscillator continuously generates its own frequency. When a car call is to be registered for a predetermined floor the oscillations generated by the oscillator associated with such floors are interrupted.

The outputs of the oscillators 10b and 101 to 106 are all fed in multiple into a control channel which may take the form of a conductor 107 and a grounded conductor 109 in the flexible or traveling cable 111 running between the elevator car A and the control cabinet 113 positioned on the penthouse floor. At the control cabinet 113 the conductor 107 is connected through a choke coil 115 to the positive terminal of a direct-current power supply 117 having its negative terminal connected to ground, and through an isolating capacitor 119 to a general amplifier 121 for the currents of all frequencies emanating from the control channels 107, 109. Connected to the output of the amplifier 121 is a separate filter for each of the oscillators 10b and 101 to 106. Each of the filters is designed to pass current of the frequency of a separate one of the oscillators. Thus, in FIG. 2 filters 13b, 131 and 136 are provided respectively for the oscillators 10b, 101 and 106.

The output of each of the filters is passed through a conventional alternating-current amplifier and the output of the latter is detected and applied to a conventional direct-current amplifier to energize a relay having a set of break contacts. Thus, the output of the filter 13b is amplified by an AC amplifier 14b and is thereafter passed through a detector included in the amplifier block. The output of the detector is amplified in a direct-current amplifier 15b and the amplified direct current is applied to the energizing winding or coil of a relay 16b. Thus as long as the oscillator 10b is oscillating the relay 16b is energized and picked up. If the oscillation of the oscillator 10b is interrupted or terminated the relay 16b drops out to close its contacts 16b1. Relays 161 to 166 are associated in a similar manner respectively with the oscillators 101 to 106.

FIG. 4 is similar to FIG. 4 of the aforesaid Santini et al. patent with the following exceptions. In the Santini et al. patent each of the car-call registering relays bCR and 1CR to 6CR for the basement floor and floors 1 to 6 respectively is energized by a separate car-call push button bc and 1c to 6c, respectively. In the present FIG. 4 these push buttons are replaced by the break contacts 16b1 and 161–1 to 166–1 respectively associated with the relays 16b and 161 to 166 of FIG. 2. Similar changes are shown for the elevator car B in FIG. 4.

FIG. 4 also shows down-floor-call registering relays 1DR to 6 DR and up-floor-call registering relays bUR and 1UR to 5UR for the various floors. These relays may be operated by push buttons in the manner set forth in the aforesaid Santini et al. patent. However, these push buttons preferably are replaced by break contacts of relays in a manner similar to that adopted for the car-call registering relays. Thus, the down-floor-call registering relays 1DR to 6DR are energized respectively through the break contacts 16–1D to 16–6D respectively. The up-floor-call registering relays bUR and 1UR to 5UR are energized respectively through the break contacts 16bU and 16–1U to 16–5U. It will be understood that each of these break contacts is operated by a relay which is controlled by an oscillator located at the floor from which the call is to be registered in the same manner by which each relay of FIG. 2 is controlled by its associated oscillator.

An electrical oscillator arrangement which has been found especially adapted for the oscillators 10b and 101 to 106 is shown in diagrammatic form in FIG. 3. One such oscillator is provided for each floor served, each oscillator producing just its own separate frequency. Each oscillator may have its own transistor 181 which may be of any known suitable type (e.g., a PNP transistor) having its base 182 connected through a first resistor 183 to the junction of a potential divider 184 fed from the negative pole of a direct current voltage source (not shown) whose positive pole is grounded. The collector electrode 185 of the transistor 181 is connected through a capacitor 186 to the ungrounded conductor 107 of the control channel and also through a resistor 187 to the negative pole of the above-mentioned direct current source. The emitter electrode 188 is grounded through a resistor 189 and is connected to the same point on the potential divider 184 as is the resistor 183 through a capacitor 191. The emitter electrode 188 also is connected to ground through a capacitor 192 and the pickup coil 193 of a magnetostrictive resonator 194, which will be described in more detail in connection with FIG. 5. A capacitor 195 bridges the terminals of the pickup coil 193. A driver 196 which may be an electrostrictive crystal like barium titanate or lead zirconate titanate attached to the midpoint of the mechanically vibrating core 197 of the resonator has opposing faces connected between the electrode 182 of the transistor 181 and ground.

An oscillator of the type diagrammed in FIG. 3 has a property particularly valuable for elevator control of ceasing to oscillate if its mechanically-vibrating core 197 is touched (for instance, by a passenger's finger) at one end or at other than its midpoint and of resuming oscillation after the contacting body is removed. The operation of one of the relays 16b and 161 to 166 in response to such touching of the core 197 in effect duplicates the closure of a car-call push button in the elevator car of the aforesaid Santini et al. patent.

While the oscillator arrangement herein disclosed is particularly advantageous in reducing the size of multiconductor cables to connect elevator car push buttons to their motor control systems such an arrangement is also advantageous for reducing the many conductors presently required to connect the motor control to the up-floor push buttons and the down-floor push buttons for the floors served by the elevator in a modern many-floored office building. Thus, as previously pointed out, the floor push buttons shown in FIG. 4 of the aforesaid Santini et al. patent preferably are replaced by relays each controlled by an oscillator located at the associated floor and each oscillating at a distinctive frequency. These oscillators may be connected through a single control channel similar to the conductors 107 and 109 to an arrangement of filters, amplifiers and relays similar to those discussed for the car-call registering devices. Inasmuch as each of the relays is energized through a filter which passes only the frequency generated by its associated oscillator, it follows that each relay responds only to operation of its associated oscillator.

Figure 5:
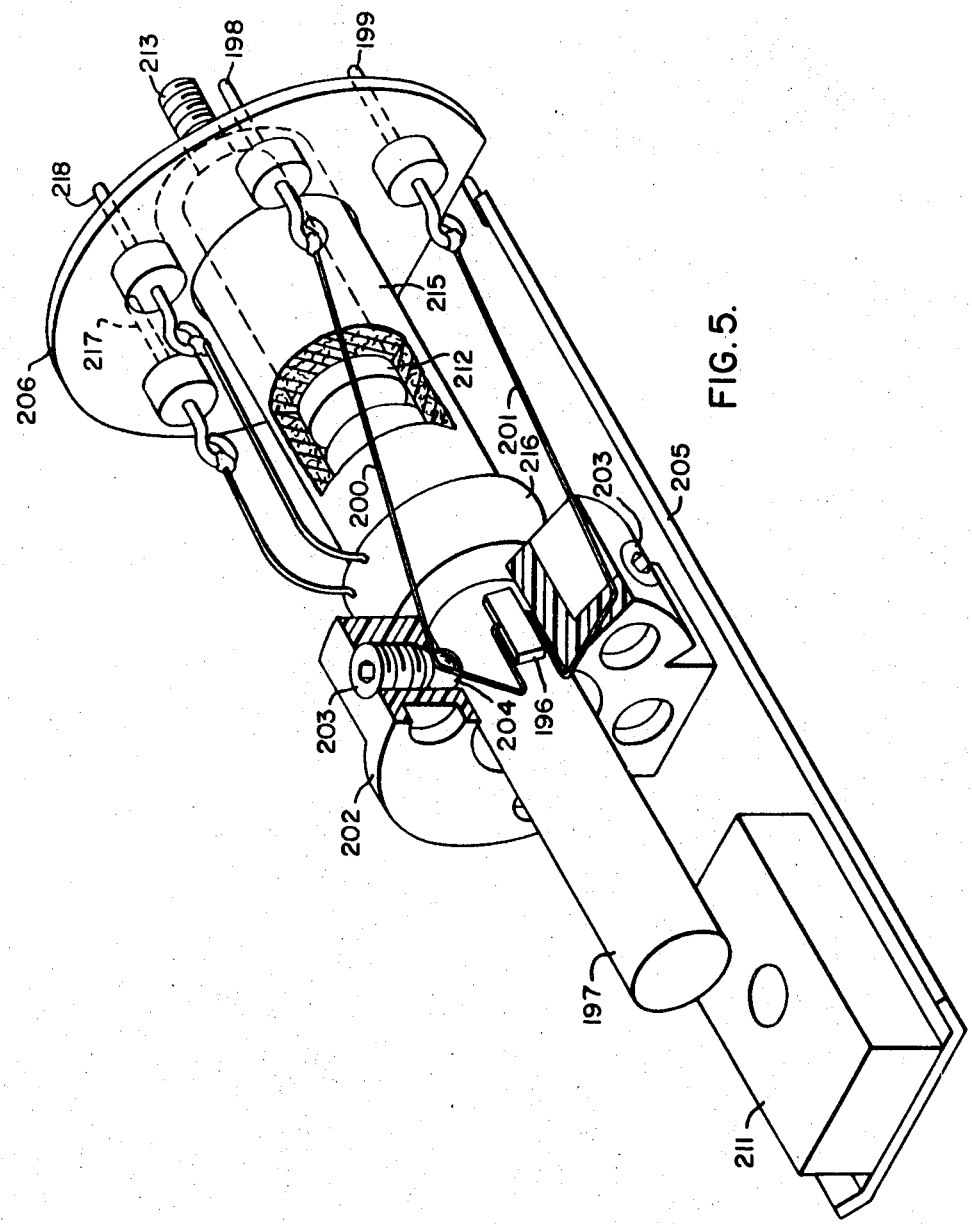
FIG. 5 is a schematic view with parts broken away of a filter which is particularly suited to use in carrying out this invention.

FIG. 5 shows in isometric view, the structure of an electrical oscillation generator which is especially advantageous for the car-call device 194 of FIG. 3. The core 197 is a magnetostrictive ferrite rod or core 197 cut to a predetermined length. The rod is designed to vibrate in a longitudinal mode with a node at its center support as will be discussed below. The rod 197 is cylindrical in shape and its length may be determined for a desired frequency from the following equation:

$$L = \frac{V}{2f}$$

where V is the velocity of compressional waves in a thin ferrite rod, and f is the desired frequency.

In the fabrication of the device, the rod 197 is cut to the desired length L. After the ferrite rod has been cut, the frequency may be somewhat altered by grinding away ferrite material at the ends of the rod or by removing some of the material near the center of the rod. The ferrite material of the rod 197 may comprise a nickel-cobalt ferrite material or other material having a magnetostrictive characteristic as discussed above. A ferrite material has the advantage of substantially no eddy current losses.

An electrostrictive driver element or device 196 is secured to the magnetostrictive rod 197 at substantially its center nodal point. The driver element may comprise a piezoelectric crystal or polarized ceramic material such as barium titanate or lead-zirconate titanate. The device 196 is secured to the rod 197 by cementing it thereto with, for example, an epoxy cement. Input signals are applied to the electrostrictive device 196 through a pair of input terminals 198 and 199 and leads 200 and 201 connecting the terminals and the device 196. The input signals should have a component that is of the same frequency as the resonant frequency of the filter in order for there to be an output. When applied to the electrostrictive device 196, these signals will cause the device to change its dimension in response thereto and at the frequency of the input signals. The rod 197 will, in turn, be driven at this frequency by the expansion and contraction of the device 196, and will, thus, be driven to vibrate in a longitudinal mode having a centrally located node where the electrostrictive device 196 is fixed. When the rod 197 is driven at its resonant frequency a much higher amplitude vibration will occur than at other frequencies as is well known.

The rod 197 is mounted at its central portion by a support member 202 which has a substantially annular shape with the rod 197 fitting therethrough. The support member 202 may comprise a plastic material. The rod 197 is held securely, yet compliantly, by the support member 202 through use of a plurality of set screws 203 (only one is shown), each of which engage a nylon ball 204 at the surface of the rod 197. The nylon balls thus provide a relatively compliant connection to the rod 197 at its central nodal point with sufficient strength being maintained by the use of the set screws 203. The support member 202 is secured to a frame 205, which may, for example, comprise steel or other permeable material, by a screw or bolt, not shown. The terminals 198 and 199 are fitted through a portion 206 of the frame member 205 and insulated therefrom by grommets 207 of any suitable insulating material, which may comprise Teflon.

To supply a magnetic field to the magnetostrictive rod 197, a bar-shaped permanent magnet 211 and a cylindrically shaped permanent magnet 212 are provided. The bar magnet 211 is secured to the frame 205, for example, gluing, and may comprise a well known ceramic type magnet. The cylindrically shaped magnet 212 is disposed along the longitudinal axis of the magnetostrictive ferrite rod 197 and is movable along this axis by a fine tuning adjustment screw 213. The magnet 212 is glued to the screw 213. By rotating the adjustment screw 213, the amount of magnetic flux applied to the ferrite rod 197 may be varied for fine tuning of the resonant frequency of the rod.

An insulating sheath member 215 is fitted over the cylindrical magnet 212 and the right portion of the rod 197 through an aperture in the portion 206 of the frame member 205. This sheath 215, for example, may comprise impregnated paper. A relatively good magnetic circuit is then provided through the ferrite rod 197, being supplied by the magnets 211 and 212 and being completed by the frame 205, including the portion 206.

When the magnetostrictive rod 197 is driven by the electrostrictive member 196, the magnetic characteristics of the rod 197 change, i.e., the permeability of the magnetostrictive material will change. This will, in turn, vary the amount of flux passing through the ferrite rod 197 due to its changing permeability with the vibrations.

To detect changes in the magnetic characteristics of the ferrite rod 197, a coil 216 is wound about the sheath member 215 adjacent to the support member 202. The coil 216 is ideally situated as close to the center of the rod 197 as possible at the point where maximum stresses are developed in the rod. The coil, for example, may comprise a plurality of turns of copper wire. The ends of the coil are connected to a pair of terminals 217 and 218 which are insulated from the portion 206 by grommets 219 of any suitable material, which may, for example, be of Teflon.

With input signals being applied across the terminals 198 and 199, the electrostrictive crystal 196 will change its physical dimensions in response thereto. Since small electrostrictive devices have a high input impedance, mostly capacitive, a large number of such devices may be driven from a common source without requiring a separate isolation state for each device or a low impedance driver. The input impedance of an electrostrictive device suitable for use herein may be from 20,000 to 100,000 ohms depending upon the ceramic size. The magnetostrictive ferrite rod 197, being cut to a predetermined length, when input signals of the corresponding frequency are applied across the electrostrictive device 196, the rod 197 will be driven into vibration in a longitudinal mode at its resonant frequency and will vibrate at a relatively high amplitude, substantially higher than when off-frequency excitation is provided. Maximum stresses will occur about the nodal center of the rod. As this mechanical stress occurs in the rod its magnetic characteristic will change with the amount of flux from the permanent magnets 211 and 212 passing through the rod also changing. Thus, the amount of flux linking the coil 216 will vary inducing an output current in the coil 216 which will appear at the output terminals 217 and 218. If an output signal appears across the terminals 217 and 218, this indicates that the input signal received at the terminals 198 and 199 contains a component at resonant frequency of the filter.

As noted in the copending application of F. G. Geil and F. B. Craig, Ser. No. 369,952 filed May 25, 1965 a device of this type also may be employed as a narrow bandpass filter.

It should be noted that other control devices located on the elevator car may be coupled similarly to apparatus located in the penthouse. Thus, in FIG. 1 the door-open button 30 may represent an oscillator similar to the oscillator 101, but having an unique frequency, and may be coupled to a relay located in the penthouse in a manner similar to the coupling of the oscillator 101 to the relay 161.

I claim as my invention:

1. In a transportation system for a structure in which stops are made by a car at a plurality of landings, motive means for moving the car relative to the structure, control means for said motive means including a plurality of call means on said car for causing said car to stop at desired ones of said plurality of landings, said control means including a control channel connecting said motive means with a plurality of said call means, each of said call means generating electric current of its own characteristic frequency, said frequencies being respectively characteristic of said landings, said control means comprising means respectively responsive to said characteristic frequencies to stop said car at the landing of which said frequency is characteristic, said control means being of a kind operative in response to absence of any of said generated frequencies from the output of said control channel to said motive means to stop movement of said car at the associated landing.

2. An arrangement as described in claim 1 wherein said control channel comprises a flexible conductor having one end supported on said car and another end connected to said motive means.

3. In a transportation system for a structure in which stops are made by a car at a plurality of landings, motive means for moving the car relative to the structure, control means for said motive means including a plurality of call means on said car for causing said car to stop at desired ones of said plurality of landings, said control means including a control channel connecting said motive means with a plurality of said call means, each of said call means generating electric current of its own characteristic frequency, said frequencies being respectively characteristic of said landings, said control means comprising means respectively responsive to said characteristic frequencies to stop said car at the landing of which said frequency is characteristic, said control means being of a kind operative in response to absence of any of said generated frequencies from the output of said control channel to said motive means to stop movement of said car, said call means comprising an electric oscillation source generating each of said characteristic frequencies, said source comprising means accessible to passengers of said car for terminating production of each of said characteristic frequencies, said source embodying a magnetostrictive member and means whereby actuation of said call means by a passenger on said car causes a mechanical contact to be made to said magnetostrictive member.

4. An arrangement as described in claim 3 wherein said magnetostrictive member comprises a nickel cobalt ferrite mechanically affixed to an electrostrictive member, an output winding inductively linked to said magnetostrictive member, and means to apply a magnetic flux to said magnetostrictive member.

5. An arrangement as described in claim 4 wherein said electrostrictive member comprises a titanate crystal.

6. In a transportation system for a structure having a plurality of landings, a car mounted for movement relative to the structure to serve said landings, motive means for moving the car relative to the structure, and control means comprising a first control unit mounted on said structure and a second control unit mounted on said car for controlling said motive means to move the car and to stop the car at selected landings, said second control unit including an electric oscillator for generating oscillations of a predetermined frequency, said oscillator including terminating means accessible to passengers in said car for terminating production of said oscillations, said first control unit including a receiver for receiving said oscillations to permit movement of said car, and stop-control means responsive to termination of receipt of said oscillations by said receiver for controlling the motive means to stop the car at a predetermined landing.

7. An arrangement as described in claim 6 wherein said oscillator terminating means is responsive to the degree of proximity of a neighboring object thereto.

8. An arrangement as described in claim 6 wherein said second control unit includes means for generating a separate frequency for each of the landings and terminating generation of any of said separate frequencies in response to a passenger operation, said stop-control means being responsive to termination of receipt of any of said frequencies for controlling the motive means to stop the car at the landing associated with the terminated frequency.

References Cited

UNITED STATES PATENTS

| | | | |
|---|---|---|---|
| 2,525,769 | 10/1950 | Bruns. | |
| 2,557,843 | 6/1951 | Schmidt | 187—29 |
| 3,203,506 | 8/1965 | Cummins | 187—29 |

ORIS L. RADER, Primary Examiner

W. E. DUNCANSON, Jr., Assistant Examiner